United States Patent [19]

Roedseth et al.

[11] Patent Number: 5,246,515
[45] Date of Patent: Sep. 21, 1993

[54] BEAD SUPPORT SYSTEM FOR USE DURING TIRE MANUFACTURE

[75] Inventors: John K. Roedseth, Bissen; Jean-Marie Durand, Luxembourg, both of Luxembourg

[73] Assignee: The Goodyear Tire & Rubber Company, Akron, Ohio

[21] Appl. No.: 797,666

[22] Filed: Nov. 25, 1991

[51] Int. Cl.⁵ .............................................. B29D 30/32
[52] U.S. Cl. .................................... 156/131; 156/135; 156/398; 156/415
[58] Field of Search ...................... 156/110.1, 398, 400, 156/401, 402, 135, 394.1, 414, 415, 131; 81/15.3

[56] References Cited

U.S. PATENT DOCUMENTS

| | | | |
|---|---|---|---|
| 1,487,033 | 3/1924 | Sloper | 425/31 |
| 3,053,308 | 9/1962 | Vanzo et al. | 156/415 |
| 3,184,361 | 5/1965 | Allitt | 156/415 |
| 3,347,964 | 10/1967 | Sidles | 425/36 |
| 3,486,198 | 12/1969 | Lewis | 425/36 |
| 3,794,457 | 2/1974 | Gazuit | 425/28 |
| 4,226,656 | 10/1980 | Appleby et al. | 156/132 |
| 4,606,714 | 8/1986 | Nixon et al. | 425/28 |
| 4,683,021 | 7/1987 | Stalter et al. | 156/415 |

FOREIGN PATENT DOCUMENTS

238934 9/1990 Japan .
238935 9/1990 Japan .

Primary Examiner—Michael W. Ball
Assistant Examiner—Richard Crispino
Attorney, Agent, or Firm—T. P. Lewandowski

[57] ABSTRACT

A system for movably supporting bead portions of a tire during tire manufacture utilizes a bead support assembly having relatively movable parts that cooperate to define an elongate, outwardly opening groove for receiving and supporting bead portions of a tire. The relatively movable parts include a flexible sheath of material forming a cover that overlies a relatively rigid underlying support. The support gives the groove its shape; however, the cover overlies the support and engages such bead portions as extend into the groove. The cover has an excessively wide central portion that slides freely from side to side through the region of the groove to maintain a point-to-point non-slip type of engagement between the cover and such bead portions as engage the cover, thereby enabling such bead portions as extend into the groove to "rotate" through a limited range of movement without causing malformation or distortion of the bead portions. Central portions of the cover are biased toward a selected side of the underlying support so that, when the cover is not engaged by bead portions of a tire, excess central portion material is caused to move toward the selected side. Interfitting spline formations are provided on the cover and on the support for guiding side-to-side movements of cover relative to the support. The spline formations also serve to prevent movement of cover relative to the support in directions that extend along the groove.

44 Claims, 5 Drawing Sheets

BEAD SUPPORT SYSTEM FOR USE DURING TIRE MANUFACTURE

BACKGROUND OF THE INVENTION

1. Field of the Invention

The present invention relates generally to a bead support system having relatively movable parts that cooperate to define a bead-receiving groove, with the movable parts including a flexible sheath of material forming a cover that overlies a relatively rigid support, and with the cover having central portions thereof that are movable from side to side through the region of the groove so that a point-to-point non-slip type of engagement can be maintained between the cover and such bead portions as extend into the groove, whereby the bead portions are permitted to "rotate" through a limited range of movement while being retained in the groove without becoming malformed or distorted. More particularly, the present invention relates to the aforedescribed type of bead retention and support mechanism, and to methods of use thereof, wherein the relatively movable cover and support have interfitting, spline formations that extend transversely relative to the length of the groove 1) for drivingly interconnecting the cover and the underlying support so that forces can be transferred therebetween in directions that extend along the length of the groove, 2) for preventing relative movement of the cover and the support in directions that extend along the length of the groove, and 3) for permitting smooth-sliding side-to-side movements of the cover to occur in unison with bead "rotation" within the groove, whereby the cover maintains a point-to-point slip-free type of non distorting engagement with such bead portions as extend into the groove even during "rotation" of the bead portions within the confines of the groove.

2. Prior Art

Pneumatic tires typically are not manufactured by casting them in molds. Rather, they typically are assembled or "built" one at a time to form uncured or "green" tires that are put through a vulcanizing process to cure the rubber compound by causing cross-linking to take place under heat and pressure.

During the assembling or "building" of a green tire, components are assembled sequentially about a substantially cylindrical "tire building drum." During much of the tire building process, the tire building drum is rotated about a substantially horizontal axis that extends centrally, longitudinally through the tire building drum. The tire building drum and the equipment that supports and rotates the drum comprise major elements of what is referred to as a "tire building machine."

At the workstation of a tire building machine, the building of a tire typically begins with the application of an innerliner layer of rubber compound so that it extends in a continuous band about central portions of the tire building drum. Plys are added one at a time with the cords of each successive ply being carefully oriented in accordance with a predetermined plan. Beads are set in place, and the plys are "turned up" around the beads to incorporate the beads into the tire. At this stage, the partially assembled tire has a generally cylindrical, tubular shape.

At a desired stage of the tire building process, the shape of a partially manufactured tire is changed from its initial generally cylindrical, band-shaped configuration to a generally toroidal shape. Apparatus for assisting with this "shaping" of a partially built tire is well known to those who are skilled in the art, and many proposals have been made for improving such apparatus. For example, U.S. Pat. Nos. 4,683,021 and 4,226,656 issued Jul. 28, 1987 and Oct. 7, 1980, respectively, disclose the use of a variety of types of inflatable bladders to position and orient selected portions of tires during changes from generally cylindrical, band-like shapes to shapes that are generally toroidal.

A particularly problematic type of tire to shape without encountering problems of bead area distortion and malformation is a radial aircraft tire. Because aircraft tires typically must carry several hundred times their own weight, they tend to be stiffly reinforced and have bead portions that do not "slip" or "slide" easily within the confines of such "grooves" as may be provided at spaced locations about the periphery of a tire building drum to receive, retain and properly position the bead portions. No known prior proposal is believed to adequately meet the needs that are encountered in "rotating the beads" of radial aircraft tires.

A number of proposals have been made to address problem tendencies toward malformation and distortion that are encountered in bead areas of tires during bead rotation and shaping. One proposal seeks to employ a complex mechanical bead support assembly that has a large number of pivotally mounted bead support sectors that are intended to pivot in unison during bead rotation. Another proposal provides oil-enclosing membranes that line the surfaces of grooves of bead supports to provide what is referred to as an "oscillating unit" to facilitate surface sliding during bead rotation. No known prior proposal is believed to provide as simple, effective, long-lived and inexpensive a solution as does the present invention to the long-standing problem of bead area malformation and distortion during the shaping of newly formed green tire assemblies.

SUMMARY OF THE INVENTION

The present invention addresses the foregoing and other needs and drawbacks and of the prior art by providing a novel and improved bead support system that effectively eliminates the need for bead areas of newly formed tire assemblies to "slip" or "slide" relative to bead support surfaces that retain and confine the bead portions during the manufacture of tires.

In accordance with the preferred practice of the present invention, use is made of a relatively simply configured bead support assembly that has two relatively movable parts that cooperate to define an elongate, outwardly opening groove for receiving, supporting and retaining bead portions of a tire. One of the relatively movable parts is a flexible sheath of material forming a cover. The other is a relatively rigid support that defines a concavely grooved, outwardly facing support surface which gives the bead-receiving groove its shape. The cover overlies the grooved support surface to define the actual surface that is engaged by such bead portions of a tire as extend into the bead-receiving groove.

The cover has a relatively wide width in comparison with the narrower width of the underlying support. The material that comprises the width of the cover is sufficiently wide to enable the cover to move from side to side relative to the grooved support surface while still fully covering the grooved support surface. By using a cover that is substantially wider than the bead-receiving groove, cover material can be "pulled through" the area the bead-receiving groove. Likewise, since the cover can move easily and smoothly from side to side through the area of the bead-receiving groove, such central portions of the cover as engage bead portions of a tire can maintain point-to-point slip-free contact with the bead portions. Thus, there is no need for bead surfaces to "slip" or "slide" relative to the cover; and, such frictional forces as customarily have been detrimentally present to cause distortion of bead areas during bead rotation are substantially eliminated.

In accordance with another feature of the preferred practice of the present invention, such central portions of the cover material as may overlie the grooved, outwardly-facing support surface are biased toward a selected side of the bead-receiving groove so that, when the cover is not engaged by bead portions of a tire, excess cover material is caused to move toward the selected side. In one embodiment, this biasing action is provided by molding the cover so that its initial shape is one that has excess cover material residing within the region of the selected side—with reliance being placed on the "memory" of the molded cover to cause excess cover material to move sidewardly so as to restore the molded configuration of the cover when the cover is not engaged by bead portions of a tire.

In another embodiment, the desired biasing action is assisted by providing a resilient biasing formation that is interposed between the cover and the support, and that extends along the bead-receiving groove at a location which is spaced to one side of the bead-receiving groove. The resilient formation preferably is enveloped by the excessively wide material of the cover and utilizes its resiliency to bias the excess of cover material toward the side of the groove where the resilient formation resides. The presence of the biasing formation causes the cover material to always return to a desired starting position and configuration after the cover disengages a newly shaped tire.

Still another feature that is provided with the preferred practice of the present invention is that, when the cover is not in engagement with a tire bead portion, the strong biasing force that tends to return the cover to its starting position and configuration causes portions of the cover that are within the region of the bead-receiving groove to be raised above the bottom wall of the groove so as to bridge between opposite sides of the groove. During movement of the bead support into engagement with bead portions of a tire at the start of bead clamping, the taut groove-bridging material of the cover comes into engagement with bead portions before the underlying support is in position to effect its full bead clamping action. This early contact of the cover with bead portions is helpful in that it permits a pressure seal to be formed between the cover and the bead portions early during bead clamping.

In accordance with still another feature of the preferred practice of the present invention, interfitting spline formations are provided on the cover and on the support for guiding side-to-side movements of cover material relative to the support. The transversely extending spline formations also serve to prevent movement of the cover relative to the support in directions that extend along the groove. By providing interfitting formations that matingly, drivingly engage in one direction and serve to guide relative movements in another direction, the needed capability for the cover to slide from side to side is preserved; and, the needed capability for the cover to transfer driving force to a tire that needs to be rotated is also met.

The cross-sectional configuration of the bead-receiving groove that is defined by the support can be described as providing what will be referred to as a concave, outwardly-opening recess. In accordance with the most preferred practice of the present invention, however, the cross-section of the "bottom wall" of the groove is not defined by a lengthy, gently curved formation of large radius. Rather, the bottom wall preferably is defined by a pair of oppositely inclined, relatively straight wall segments that are smoothly joined by a short, relatively small radius arc so as to define a groove of generally V-shaped cross-section. By providing a V-shaped groove, bead portions received therein are found to "self-align" to a better degree than they do if the groove has a more gently rounded bottom cross-section. A V-shaped cross-sectional configuration has been found to provide a "better defined" bead position that will better accommodate bead bundles having diameters that vary slightly. Moreover, because a round-bottomed groove does not provide proper bead positioning if the bead bundle has a radius that is less than the radius of the groove, it is desirable for the radius at the base of the groove to be less than the radius of the smallest bead bundle that is to be positioned by the groove.

While features of the present invention can be utilized with segmented-ring bead clamping units, in the most preferred practice of the present invention, the relatively flexible cover and the relatively rigid support are formed as separate ring-shaped moldings of plastics material such as polyurethane. A relatively soft polyurethane (e.g., having a Shore A hardness that is within the range of about 40 to about 50, with a Shore A hardness of about 40 being most preferred) preferably is used to form the cover. A relatively hard polyurethane (e.g., having a Shore A hardness that is within the range of about 60 to about 70, with a Shore A hardness of about 60 being most preferred) preferably is used to form the underlying support.

The system of the present invention is particularly well suited for use with radial aircraft tires that tend to present serious problems in maintaining proper bead area configurations during rotation of the beads.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF THE PREFERRED EMBODIMENT

In the description that follows, reference will be made to four embodiments of bead support assemblies that are depicted in the drawings. Because the four embodiments have features that, in many respects, are quite similarly configured and/or that "correspond" in that they are changed only slightly from one embodiment to another, a system of corresponding reference numerals has been utilized so that corresponding features of the four embodiments can be identified readily.

In FIGS. 1-6 wherein features of the first embodiment are depicted, three digit reference numerals are used. In FIGS. 7-9, 10-13 and 14 wherein features of the second, third and fourth embodiments are depicted, respectively, four digit reference numerals are used that begin with the digits "1," "2" or "3" followed by the same three digits as are used in FIGS. 1-6 to indicate corresponding features of the first embodiment. Thus, the cover 170 that appears in FIGS. 1-6 "corresponds" to the cover 1170 that appears in FIGS. 7-9, to the cover 2170 that appears in FIGS. 10-12, and to the cover 3170 that appears in FIG. 14.

Because it is common in the tire building industry to utilize tire building drums having portions that are radially expansible and collapsible, a variety of mechanisms for causing ring-shaped components of tire building drums to expand or collapse in diameter are well known and need not be described or illustrated here for they form no part of the present invention. Thus, to the extent that a description has been omitted herefrom of any of the several commonly utilized mechanisms for expanding and collapsing rings does not mean that the invention features that are described herewith can be used only with ring or drum structures of fixed diameter. To the contrary, features of the present invention can be used with fixed diameter rings, substantially continuous rings that are mechanically expansible and contractible, and segmented rings that are expansible and contractible.

Figure 4:
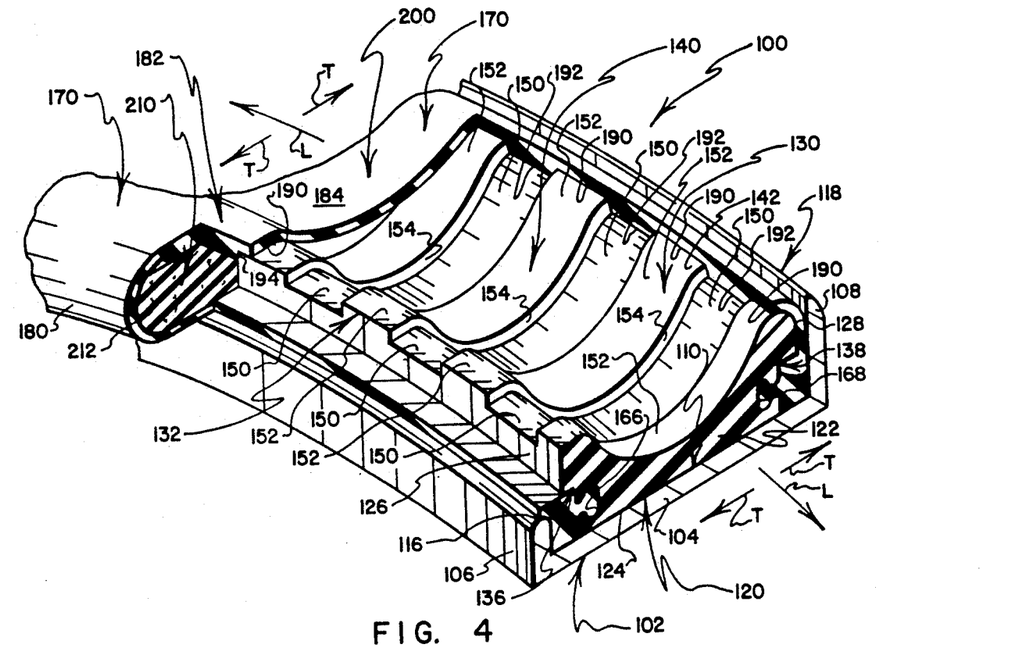
FIG. 4 is a perspective view, on an enlarged scale, of selected features of one of the bead support portions that is shown in FIG. 1.

Those who are skilled in the art will understand readily why what is depicted in FIG. 4 is only a "typical segment" of a ring. Inasmuch as features of the invention that are illustrated in FIG. 4 can be used with a wide variety of supporting ring structures (regardless of whether they are of fixed diameter, expansible and collapsible, continuous or segmented), it is appropriate to depict and describe the present invention in terms of a "ring segment," for a typical ring segment can be viewed as having been taken from any one of the various types of ring support mechanisms described above.

In preferred practice, the present invention utilizes two relatively movable components to cooperatively define what is referred to herein as a "bead-receiving groove." If features of the invention are to be used with segmented expansible/collapsible supporting ring mechanisms, each segment can be independently provided with elongate lengths of the first and second relatively movable components. If features of the invention are to be used with substantially continuous ring mechanisms that can increase or decrease their diameters as may be needed to selectively engage and disengage portions of a tire assembly, a highly advantageous capability of the present invention can be utilized, namely the capability to form its two relatively movable components as continuous rings that can be resiliently stretched and collapsed to accommodate relatively small changes in diameter such as are needed to implement or release the radial clamping of bead portions of a tire.

Referring briefly to FIG. 4 wherein a ring segment that embodies features of the preferred practice of the present invention is illustrated, it will be understood that the channel-like member 102 schematically represents a segment of any of a variety of supporting ring mechanisms on which ring or ring segment assemblies of a relatively rigid support 120 and a relatively flexible cover 170 can be mounted. Further, it will be understood that, in preferred practice, the the preferred way to form and utilize the support 120 and the cover 170 (i.e., two relatively movable components that cooperate to define a bead-receiving groove 200) is to separately mold the support 120 and the cover 170 in continuous ring-shaped annular forms.

Figure 1:
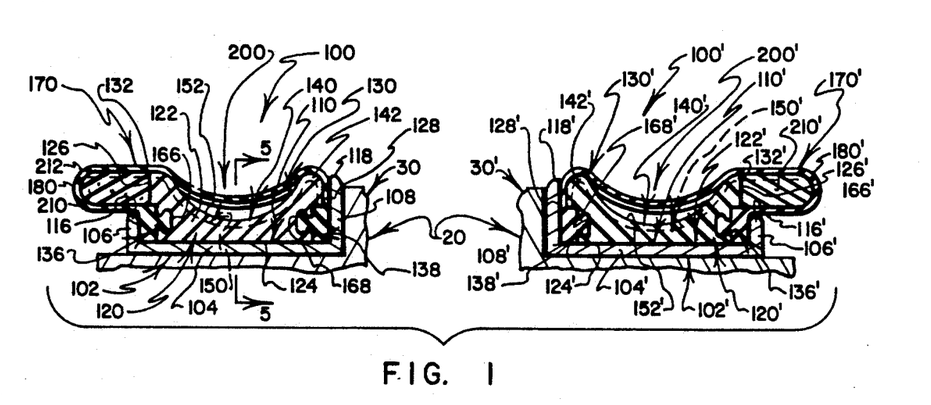
FIG. 1 is a longitudinal cross section through bead support portions of a tire building drum that embody one form of the present invention, with conventional portions of the tire building drum being foreshortened and depicted schematically.
Figure 2:
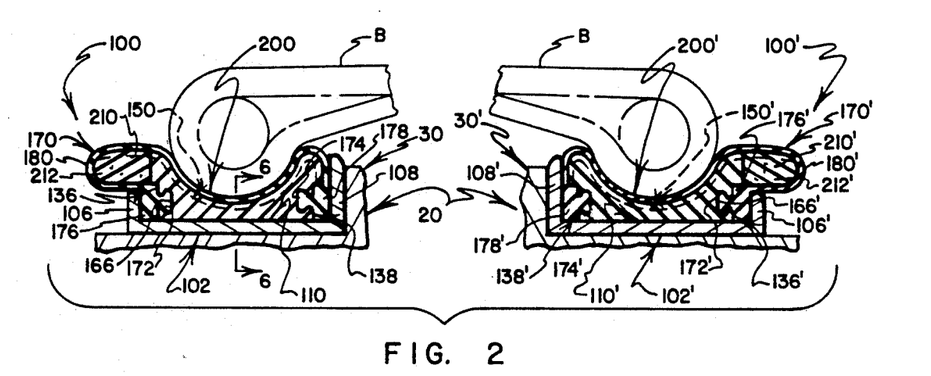
FIG. 2 is a sectional view similar to FIG. 1 but with bead support portions of the tire building drum being shown engaging bead portions of a band-shaped tire assembly that is being "built" on the tire building drum, with such portions of the tire as extend between the bead portions being foreshortened.
Figure 3:
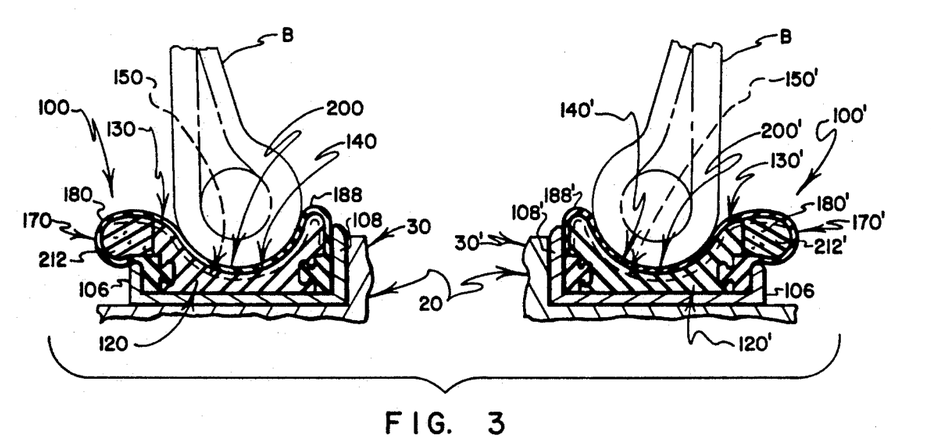
FIG. 3 is a sectional view similar to FIG. 2 but with the bead portions of the tire being "rotated" relative to the positions in which the bead portions are depicted in FIG. 2.

Turning now to a description of features of the first of three embodiments, and referring to FIGS. 1-3, one form of bead support that utilizes features of the preferred practice of the present invention is embodied in left and right bead support assemblies that are identical except that each is the mirror image of the other. The left bead support assembly is indicated generally by the numeral 100. The right bead support assembly is indicated generally by the numeral 100'. The assemblies 100, 100' are symmetrical about a longitudinal axis (not shown)[1] about which the assemblies 100, 100' are rotated in unison during the building of a tire.

While the longitudinal axis about which the assemblies 100, 100' rotate and are symmetrical is not shown in FIGS. 1-3, if it were to be shown, it would appear at a location spaced a short distance downwardly from such portions of the assemblies 100, 100' as are depicted, and would extend horizontally. In the aforementioned U.S. Pat. No. 4,683,021, a typical such longitudinal axis is designated "A—A" in the drawings.

Also shown in FIGS. 1-3 are left and right portions 30, 30' of a conventional tire building drum 20. Very little of the drum 20 is depicted in the drawings. Inasmuch as the present invention is intended to work with a wide variety of conventional tire building drums, and inasmuch as the details of the configuration of selected tire building drums form no part of the present invention, reference is made to U.S. Pat. Nos. 4,226,656 and 4,683,021 that disclose typical tire building drum features, the disclosures of which patents are incorporated herein by reference.

Referring principally to FIGS. 1 and 4, the bead support assembly 100 includes a channel-like member 102 that opens radially outwardly as it extends along at least a portion of an imaginary circle that is centered about the aforementioned longitudinal axis. The member 102 has a base wall 104 and a pair of left and right end walls 106, 108. The walls 104, 106, 108 cooperate to define an outwardly facing channel 110 within which a pair of relatively movable parts are stationed to cooperatively define a concave, outwardly facing bead-receiving groove that is designated by the numeral 200. The walls 106, 108 have outer edge regions 116, 118 respectively, that are smoothly rounded.

The relatively movable members that cooperate to define the bead-receiving groove 200 are a support 120 and a cover 170. Features of the support 120 will be described before turning to features of the cover 170.

Referring principally to FIGS. 1 and 4 (wherein such numerals as follow in the next few paragraphs are found), the support member 120 has a base portion 122 that extends into the outwardly facing channel 110. The base portion 122 has a bottom surface 124 that extends into engagement with the base wall 104. Side surfaces 126, 128 of the support member extend in spaced, parallel relationship relative to the end walls 106, 108, respectively.

Grooves 136, 138 are provided at the junctures of the opposed side surfaces 126, 128 with the bottom surface 124. The grooves 136, 138 have undercut groove portions 166, 168 that open toward the end walls 106, 108, respectively.

An outer support surface 130 joins with the end surfaces 126, 128. The outer surface 130 has a concavely curved central region that defines an outwardly facing, generally concave, rounded-bottom groove that is indicated generally by the numeral 140. A substantially right-angle corner 132 is formed between the left end surface 126 and the outer surface 130. A rounded juncture 142 is formed between the right end surface 128 and the outer surface 130.

Referring to FIG. 4, the concave groove 140 extends longitudinally along the length of the support member 120 in directions that are indicated generally by arrows L. The groove 140 has a width (as measured from one of its sides to the other) that extends transversely with respect to the length of the groove 140 in directions that are indicated generally by arrows T. When reference is made herein to something that extends longitudinally with respect to the groove 140, or that extends along the length of the groove 140, what is being referred to are the directions that are indicated in FIG. 4 by the arrows L. When reference is made herein to something that extends transversely with respect to the groove 140, or that extends from side-to-side with respect to the groove 140, what is being referred to are the directions that are indicated in FIG. 4 by the arrows T.

The concave groove 140 is substantially centered within the channel 110 that is defined by the channel-shaped member 102. The concave groove 140 extends longitudinally in a manner that substantially parallels underlying portions of the base wall 104, and in a manner that positions the concave groove 140 about midway between the end walls 106, 108.

Referring to FIG. 4, grooves 150 open outwardly through the outer surface 130. The grooves 150 extend transversely with respect to the concave groove 140, are regularly spaced, and are of substantially equal and uniform width. The grooves 150 cover the entire width of the outer surface 130 and open through the right end surface 128. At locations between the grooves 150, elongate, transversely extending spline formations 152 are defined. Small side walls 154 extend along opposite sides of the spline formations 152. The side walls 154 also define opposite sides of the grooves 150.

The grooves 150 and splines 152 cover the entire width of the outer surface 130 and open through the right end surface 128. The small side walls 154 provide drive surfaces that are slidingly engaged by side walls 194 of splines 192 and grooves 190 that are formed on the cover 170, as will be be explained shortly.

Referring principally to FIGS. 2 and 4 (wherein such numerals as follow in the next few paragraphs are found), the cover 170 has left and right end regions 176, 178 that carry undercut projections 172, 174 respectively. The left end region 176 extends into the groove 136 and has its undercut projection 172 extending into the undercut groove portion 166. The right end region 178 extends into the groove 138 and has its undercut projection 174 extending into the undercut groove portion 168.

Extending away from the left end region 176 is a reach of cover material 180 that wraps around a rounded-nose 212 of a resilient biasing member 210 (a discussion of the character and function of the biasing member 210 is presented later herein). Between the reach of material 180 and the right end region 178 extend what will be referred to as "central portions" 182 of the cover 170. The reach of "central portions" cover material that extends through the concave groove 140 will be referred to as "selected parts" 184 of the "central portions" 182.

Figure 5:
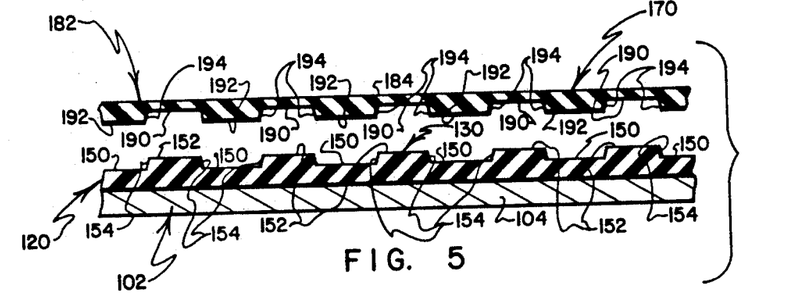
FIG. 5 is a sectional view, on an enlarged scale, as seen from a plane that is indicated by a line 5—5 in FIG. 1.
Figure 6:
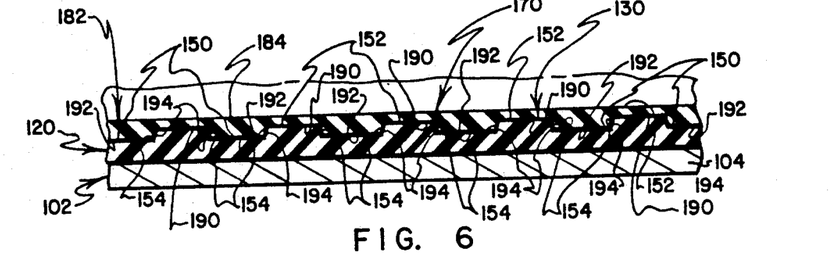
FIG. 6 is a sectional view, on an enlarged scale, as seen from a plane that is indicated by a line 6—6 in FIG. 2.

Referring to FIGS. 4-6, the surface of the cover 170 that faces toward the grooves 150 and splines 152 of the support 120 is provided with a corresponding set of interfitting grooves 190 and splines 192, with small side walls 194 defining opposite sides of the grooves 190 and splines 192. Referring to FIG. 6, when the cover 170 is seated in the lowermost portion of the concave groove 140, the side walls 194 of the cover 170 matingly engage the side walls 154 of the grooves 150 and splines 152 that are formed in the support surface 130 of the support member 120. While a thin film of suitable lubricant (not shown) preferably is utilized to thoroughly cover the grooves, splines and side walls 150, 190, 152, 192, 154, 194 to facilitate sliding movement of the central portions 182 of the cover 170 through the concave groove 140 relative to the support member 120 in transverse directions T, the engagement of the side walls 154 with the side walls 194 prevents relative movement of the cover 170 relative to the support 120 in directions L extending longitudinally along the concave groove 140.

The resilient biasing member 210 is interposed between the left end wall 126 of the support 120 and the reach of cover material 180 that is wrapped about the the remainder of the periphery of the biasing member 210. The biasing member 210 is formed from a resiliently compressible/deformable body of foam plastics material such as polyurethane or the like. To assist in holding the resilient biasing member 210 in place, it can be adhered to the left end wall 126.

Referring to FIGS. 1 and 4, when there are no tire bead portions in engagement with the selected parts 184 of the central portions 182 of the cover 170, the resilient biasing member 210 serves to tension the central portions 182 so that excess cover material is pulled across the support member 120 in a way that maximizes the amount of cover material that is utilized to wrap the biasing member 210. When this happens, the selected parts 184 of the central portions 182 of the cover 170 are pulled adequately taut to raise the selected parts 184 out of bottom areas of the concave groove 140—with the result that the selected parts 184 "bridge" across the concave groove 140 (as is best seen in FIG. 1).

Referring to FIG. 2, when tire bead portions "B" are caused to extend into the bead-receiving groove 200 and into engagement with the selected parts 104 of the cover 170, the selected parts are moved progressively farther into bottom areas of the concave groove 140 until the condition shown in FIGS. 2 and 6 is reached wherein the grooves and splines 150, 190, 152, 192 are in full mating engagement, and the bead portions B are fully seated within the bead-receiving groove 200.

The farther that the selected parts 184 are depressed into bottom portions of the groove 140, the more cover material is pulled through the groove 140, whereby the length of the reach 180 that extends about the biasing member 210 is diminished and the biasing member 210 undergoes compressive deformation, as is shown in FIG. 2.

Referring to FIGS. 2 and 3, there comes a point in time during the tire manufacturing process when the bead portions B need to be rotated through about a ninety degree range of movement as the associated green tire assembly is shaped to convert it from a generally cylindrical band-shape to a toroidal shape. As the rotation of the bead portions B progresses, still more of the reservoir of cover material 180 that surrounds the biasing member 210 is depleted, and the biasing member 210 becomes compressed still more, as is shown in FIG. 3. At the same time that cover material is being fed into the groove 140 along its left side, it is being transferred out of the groove 140 along its right side, with the result that a rounded bulge of cover material 188 collects along the right side the bead support 100, as is shown in FIG. 3. However, once the rotated bead portions B are released from engagement with the cover 170, the action of the biasing member 210 promptly returns the cover 170 to the configuration that is depicted in FIGS. 1 and 4.

From the foregoing description of the first embodiment, it will be understood that the system of the present invention features not only a novel and improved bead support apparatus but also novel and improved methods for minimizing "slipping" and "sliding" between bead portions B and a wide cover 170 that is biased by the biasing means 210 toward a starting position (shown in FIGS. 1 and 4) so that cover material can be duly "pulled through" the groove 140 when bead rotation takes place. And, by holding the selected parts 184 of the cover 170 taut so as to bridge the groove 140 when the cover 170 is not being engaged by tire bead portions B, the cover 170 is held in aloft of the bottom part of the groove 140 so as to engage and establish a pressure seal quickly when the bead support 100 is being moved into clamping engagement with the bead portions B.

Figure 7:
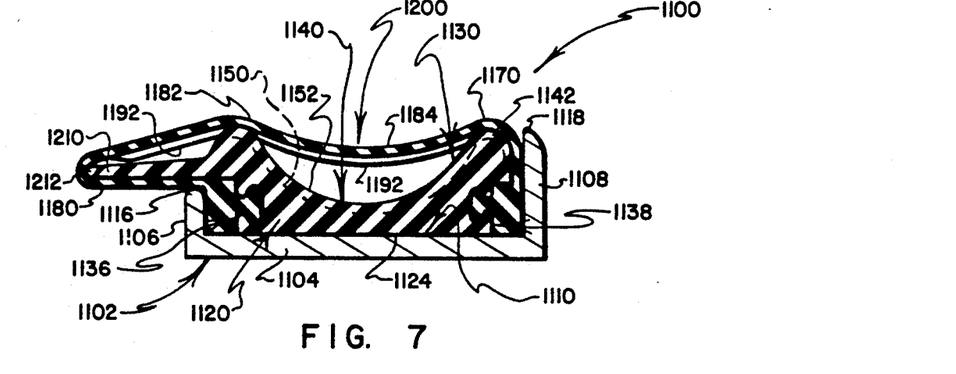
FIG. 7 is a longitudinal sectional view of a second form of bead support that embodies features of the present invention.
Figure 8:
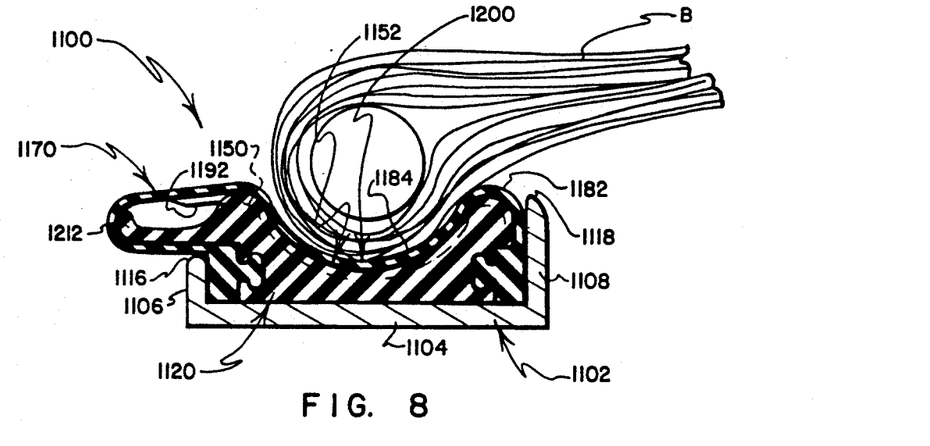
FIG. 8 is a sectional view similar to FIG. 7 but with the bead support being shown engaging bead portions of a tire.
Figure 9:
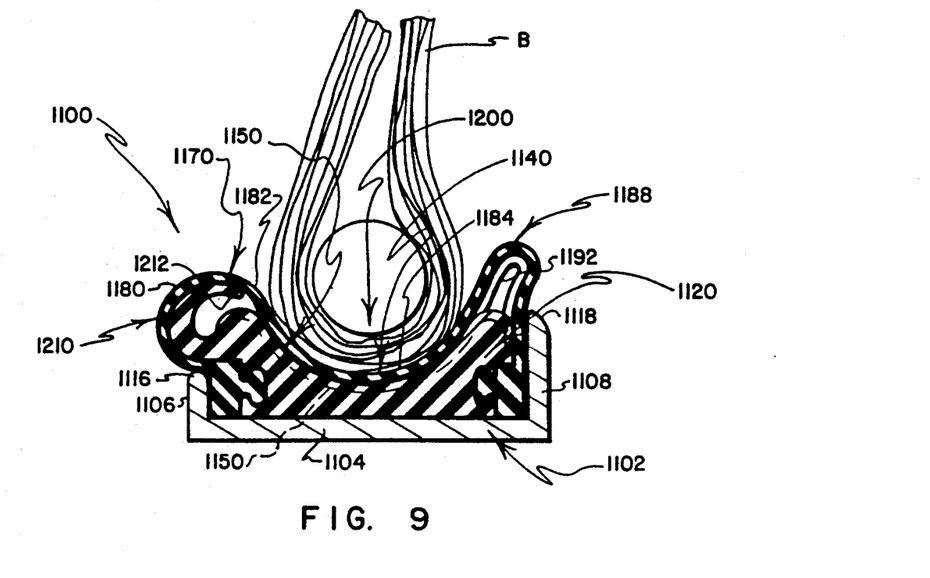
FIG. 9 is a sectional view similar to FIG. 8 but with the tire bead portions being "rotated" relative to the positions in which the bead portions are depicted in FIG. 8.

Referring to FIGS. 7-9, the second embodiment is identical to the first with the exception that, instead of utilizing a body of resiliently compressible material to form the biasing means (as is the case with the first embodiment), a nose-shaped leftwardly extending extension 1210 of the support member 1120 is provided to serve the deformed as the cover 1170 is pulled into and through the concave groove 1140, the nose-shaped projection 1210 simply deflects into a curled form as is shown in FIGS. 8 and 9. Inasmuch as all other aspects of the second embodiment 1100 are the same as the aforedescribed first embodiment 100, the use of corresponding reference numerals in designating corresponding components of the first and second embodiments 100, 1100 should make clear the character and operation of the second embodiment 1100.

Figure 11:
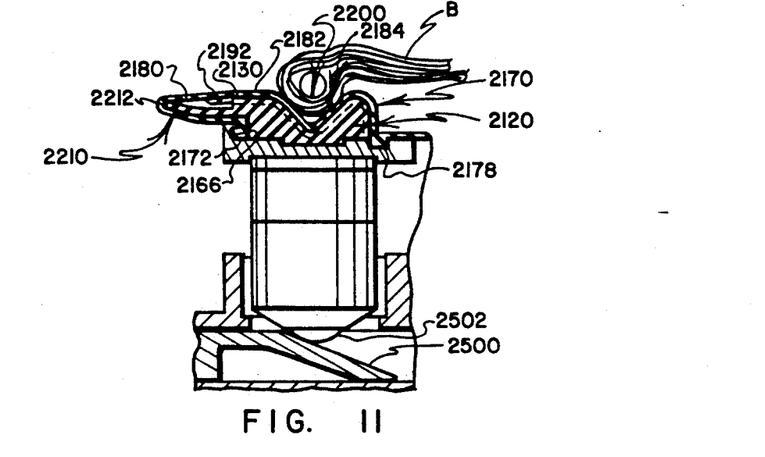
FIG. 11 is a sectional view similar to FIG. 10 but with the bead support being shown engaging bead portions of a tire.
Figure 12:
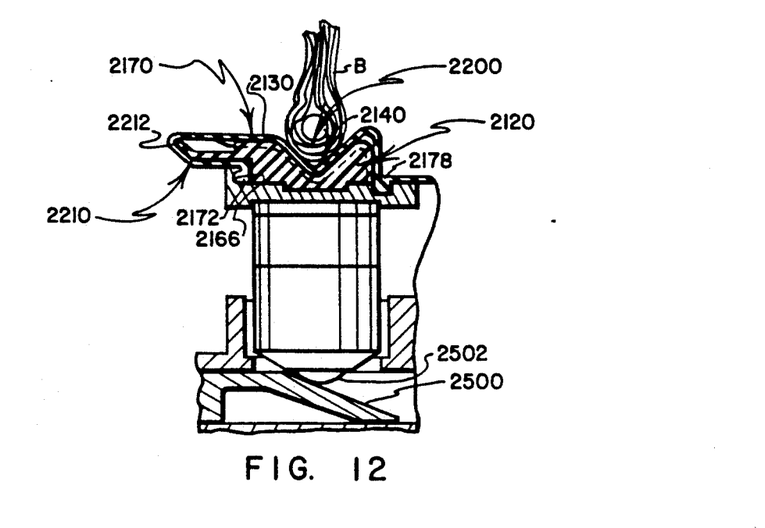
FIG. 12 is a sectional view similar to FIG. 11 but with the tire bead portion being "rotated" relative to the positions in which the bead portions are depicted in FIG. 11.
Figure 13:
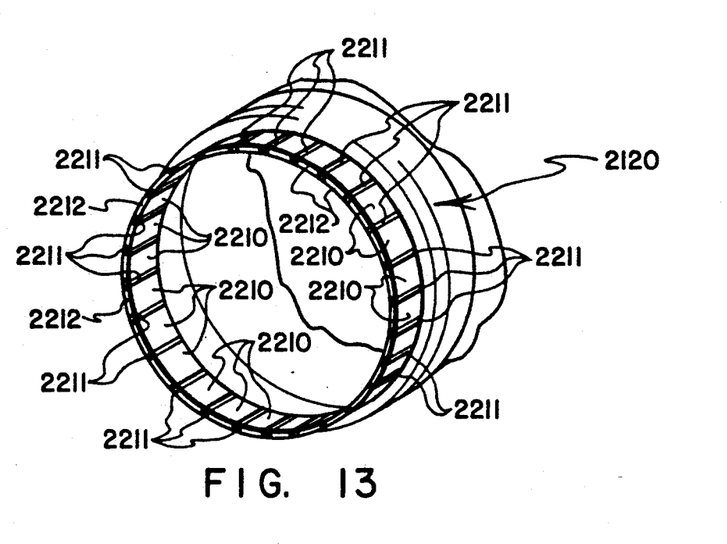
FIG. 13 is a perspective view depicting portions of a resilient biasing member that is utilized in the bead support embodiment of FIGS. 10-12, with the axially-slit character of a lip portion of the resilient biasing member being readily apparent; and, FIG. 14 is a sectional view similar to FIG. 10 but showing a fourth form of bead support that embodies features of the present invention.

Referring to FIGS. 10-13, the third embodiment 2100 is substantially identical in "function" to the second embodiment 1100, but differs therefrom in "form" in that 1) the configurations of peripheral portions of the support 2120 and the cover 2170 differ from the corresponding configurations utilized in the second embodiment 1100; 2) the nose-shaped extension 2210 of the biasing means is axially slit at spaced locations (as is best seen in FIG. 13); and, 3) the groove 2140 is depicted as having a more preferred "V-shaped" character.

Figure 10:
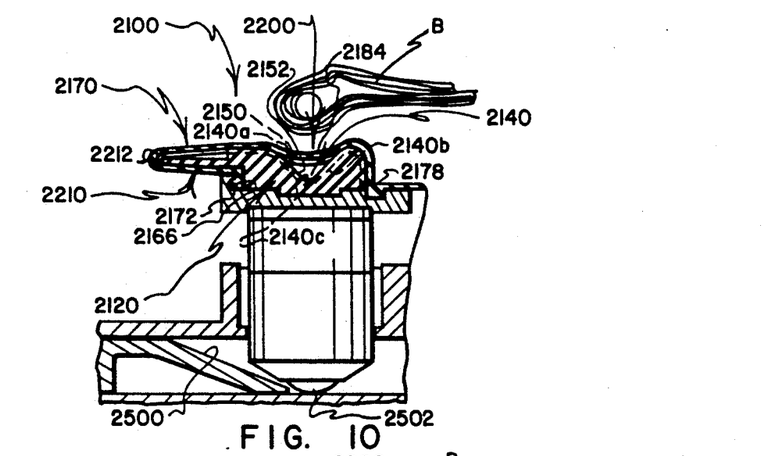
FIG. 10 is a longitudinal sectional view of a third form of bead support that embodies features of the present invention, with the view also depicting adjacent conventional portions of a tire building drum being shown in greater detail than in the foregoing views, and with the bead support being shown in underlying spaced relationship with bead portions of a tire.

A feature that is shown in FIGS. 10-12 that does not appear in others of the FIGURES is the illustration of how an inclined cam surface 2500 and a cam follower 2502 are used to move the bead support into clamping engagement with bead portions B of a tire that is being built. Inasmuch as all other essential aspects of the second and third embodiments 1100 and 2100 are substantially the same (as is the manner in which these embodiments function), the use of corresponding reference numerals in designating corresponding components of the second and third embodiments 1100, 2100 should make clear the character and operation of the third embodiment 2100.

The configurations of peripheral portions of the support 2120 and the cover 2170 (i.e., at locations where the support 2120 and the cover 2170 are joined and are clamped together so as to be securely supported) are not of particular consequence inasmuch as it readily will be recognized by those who are skilled in the art that many other conventional forms of connection can be utilized to effect the purpose, namely to securely connect and support the support 2120 and the cover 2170.

Referring to FIG. 13, the nose-shaped leftwardly extending extension 2210 of the support member 2210 is provided with a plurality of substantially equally spaced slits 2211 The slits 2211 enable the support member 2210 to perform its biasing action through the use cf approximately two dozen "independent" nose extensions. By axially slicing the nose extension 2210 in the manner that is depicted in FIG. 13, improved, independent movement of the nose extension components results.

The V-shaped character of the groove 2140 that is formed in the support 2120 represents the most preferred practice of the present invention. While the views that are presented by FIGS. 10-12 do not permit the spline type connection that is provided between the cover 2710 and the support 2120 to be shown (other than by presenting a dotted line that is indicated by the numeral 2150), the spline-type interconnection that is discussed in conjunction with FIGS. 4-6 also represents a feature of the most preferred practice of the present invention.

Referring to FIG. 10, in preferred practice the V-shaped groove 2140 has its bottom wall defined by a pair of oppositely inclined, substantially planar surface portions 2140a, 2140b that are smoothly joined at the lowermost part of the groove 2140 by a curved surface portion 2140c that has a relatively small radius of curvature as compared with the radius of the bead bundle B that is to be seated in the groove 2140 atop the cover 2710.

Figure 14:
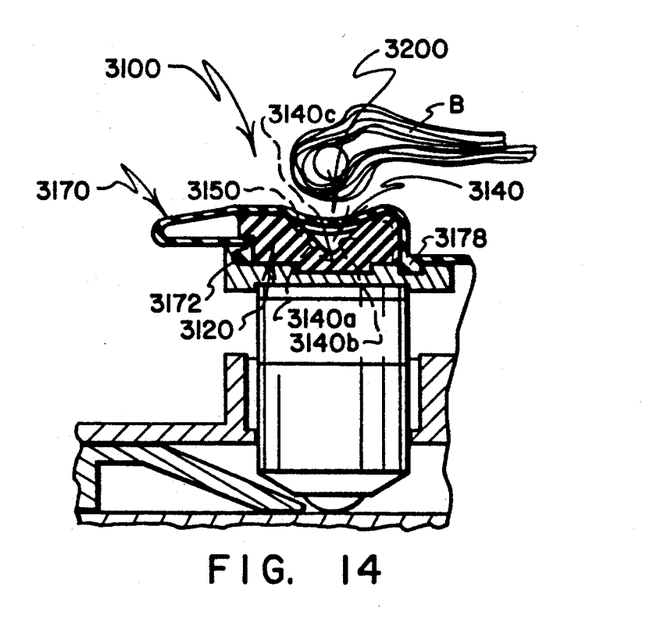

As will be readily apparent from comparing the fourth embodiment 3100 as shown in FIG. 14 with the third embodiment 2100 as shown in FIG. 10, the only difference between these two embodiments is that the "body of resiliently compressible material" that forms the biasing means 2210 in the third embodiment 2100 has been eliminated in the fourth embodiment 3100. Instead of utilizing a separate biasing device, the fourth embodiment 3100 simply relies on the "memory" of the molded cover 3170 to cause excess material of the cover 3170 to return to the left side of the V-shaped groove 3140 when the material of the cover 3170 is not being retained elsewhere as by being engaged by tire bead portions B. To instill the desired "memory" in the material of the cover 3170, the cover 3170 preferably is formed in a suitably configured mold (not shown) that enables the material of the cover to "relax" while assuming the position shown in FIG. 14.

From the foregoing description, it now should be apparent that the present invention alleviates the need for "slip" and "slide" of bead portions relative to grooved bead supports that serve to retain the bead portions during shaping of a tire to convert it from a generally cylindrical band-like shape to a toroidal shape. By eliminating the need for "slip" and "slide," the tendency for attendant friction forces to detrimentally deform the bead areas is likewise alleviated.

Although the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method of supporting tire bead portions in a groove for rotation so that the groove-supported bead portions can be rotated through a range of movement that is sufficient to permit a green band-shaped tire assembly to assume a generally toroidal shape, with the groove-supported bead portions being retained within the groove during such rotation while, at the same time, minimizing the possibility that tire bead portions will be deformed as the result of such rotation, comprising the steps of:

a) providing a bead support assembly having relatively movable parts that cooperate even while moving relative to each other to define a bead-receiving groove, with said bead support assembly including:
  i) at least one substantially rigid, elongate ring segment having a support surface that curves inwardly as it extends along the length of the ring segment, and having a generally concave groove that extends along the length of the support surface and opens outwardly through the inwardly curved support surface;
  ii) a sheath of material forming a flexible cover that overlies the outwardly opening groove, that has a length that extends along the length of the support surface, and that has a width that is sufficient to permit the cover to extend into and fully line the concave groove while also extending beyond opposite sides of the concave groove, with the distance by which the cover extends beyond a selected one of the opposite sides being sufficient to provide a reach of cover material that can be slided into the concave groove to assure that the groove remains fully lines as cover material that once lined the concave groove is slid out of the opposite side of the concave groove, and with the lining of the concave groove that is provided by the cover being appropriately configured to cooperate with the configuration of the concave groove so that the cover-lined concave groove defines a smooth surfaced bead-receiving groove even while portions of the cover are moving relative to the support surface to slide cover material into one side of the concave groove and out the other side of the concave groove;
b) introducing tire bead portions into firm seated engagement within the bead-receiving groove so that the tire bead portions are supported by and retained within the bead-receiving groove;
c) maintaining point-to-point non-slip engagement between the cover and bead portions that engage the cover so hat the bead portions that are retained by the bead-receiving groove can rotate as may be needed during shaping of the associated tire assembly;
d) while said point-to-point non-slip engagement is being maintained, rotating the groove-supported bead portions to effect shaping of an associated tire assembly, with sliding movement of the cover relative to the underlying support taking place concurrently with the rotation of the groove-supported bead portions to thereby minimize the possibility that tire bead portions will be deformed as the result of such rotation; and,
e) wherein the step of providing a bead support assembly having movable parts that cooperate even while moving relative to each other to define a bead-receiving groove includes the steps of providing the generally concave groove and the cover with an array of transversely extending interengaging guide formations for assuring that movement of the cover relative to the ring segment is limited to sliding type movement that extends transversely relative to the length of the concave groove.

2. A method of supporting tire bead portions in a groove for rotation so that the groove-supported bead portions can be rotated through a range of movement that is sufficient to permit a green band-shaped tire assembly to assume a generally toroidal shape, with the groove-supported bead portions being retained within the groove during such rotation while, at the same time, minimizing the possibility that tire bead portions will be deformed as the result of such rotation, comprising the steps of:

a) providing a bead support assembly having movable parts that cooperate even while moving relative to each other to define a bead-receiving groove, with said bead support assembly including:

i) at least one substantially rigid, elongate ring segment having a support surface that curves inwardly as it extends along the length of the ring segment, and having a generally concave groove that extends along the length of the support surface and opens outwardly through the inwardly curved support surface;

ii) a sheath of material forming a flexible cover that overlies the outwardly opening groove, that has a length that extends along the length of the support surface, and that has a width that is sufficient to permit the cover to extend into and fully line the concave groove while also extending beyond opposite sides of the concave groove, with the distance by which the cover extends beyond a selected one of the opposite sides being sufficient to provide a reach of cover material that can be slided into the concave groove to assure that the groove remains fully lines as cover material that once lined the concave groove is slided out of the opposite side of the concave groove, and with the lining of the concave groove that is provided by the cover being appropriately configured to cooperate with the configuration of the concave groove so that the cover-lined concave groove defines a smooth surfaced bead-receiving groove even while portions of the cover are moving relative to the support surface to slide cover material into one side of the concave groove and out the other side of the concave groove;

b) introducing tire bead portions into firm seated engagement within the bead-receiving groove so that the tire bead portions are supported by and retained within the bead-receiving groove;

c) maintaining point-to-point non-slip engagement between the cover and bead portions that engage the cover so hat the bead portions that are retained by the bead-receiving groove can rotate as may be needed during shaping of the associated tire assembly;

d) while said point-to-point non-slip engagement is being maintained, rotating the groove-supported bead portions to effect shaping of an associated tire assembly, with sliding movement of the cover relative to the underlying support taking place concurrently with the rotation of the groove-supported bead portions to thereby minimize the possibility that tire bead portions will be deformed as the result of such rotation; and, e) interposing biasing means between the cover and the ring segment for biasing portions of the cover toward said selected one of the sides of the groove.

3. A tire building drum with a bead support assembly having parts which move relative to each other and that cooperate to define a generally concave, outwardly facing groove segment for receiving and retaining within the groove segment bead portions of a tire that is being built on a tire building drum, and for movably supporting such bead portions to enable such bead portions to be rotated through a limited range of movement while being retained by the groove and without causing bead portion malformation or distortion, comprising:

a) support means including at least one substantially rigid, elongate ring segment having an outwardly facing support surface that has a support surface length that extends along the length of the ring segment, that has a support surface width that extends between opposite sides of the ring segment, and that defines an outwardly facing, generally concave groove having a groove length that extends along the ring segment length, and having a side-to-side groove width that extends transversely relative to the groove length;

b) cover means including a substantially flexible sheath of material forming a cover that is connected to the support means at locations on opposite sides of groove, that has a cover length that extends along the support surface length, and that has central portions that extend transversely to define a cover width that is greater than the support surface width for permitting selected parts of the central portions to overlie the outwardly facing support surface, for extending into the groove to provide a cover-overlain groove of generally concave shape for receiving, supporting and retaining tire bead portions within the confines of the cover-overlain groove, and for being slidably movable within the concave groove in coordination with the rotation of groove-retained bead portions through a limited range of rotation movement so that a substantially non-slipping type of engagement is maintained between the selected parts of the cover and such bead portions as are engaged thereby, and with said coordination of the sliding movement of central portions of the cover with rotation movement of the bead portions serving to minimize the possibility that bead portion malformation or distortion may occur during rotation movement of the bead portions; and, c) biasing means interposed between the cover means and the support means for biasing the central portions of the cover in a direction that extends generally away from the concave groove toward a selected one of the opposite sides of the ring segment, whereby, when bead portions that extend into the cover-overlain groove are caused to rotate through a limited range of movement while being retained within the cover-overlain groove, the selected parts of the cover that are in engagement with such bead portions slide within the concave groove in opposition to the action of the biasing means.

4. The tire building drum with a bead support assembly of claim 3 wherein the biasing means is configured so as to apply sufficient biasing force to central portions of the cover to assure that, when no bead portions extend into the cover-overlain groove, at least some of the selected parts of the cover that overlie the concave groove are held outwardly so as to bridge the concave groove without extending into contact with the deepest part of the concave groove.

5. The tire building drum with a bead support assembly of claim 3 wherein the biasing means includes a resiliently deformable body of material that is interposed between the the cover means and the support means, with the biasing means being configured to be resiliently deformed during said sliding movement of the selected parts of the cover.

6. The tire building drum with a bead support assembly of claim 5 wherein the resiliently deformable body of material is interposed between the cover means and the support means at a location near said selected one of the opposite sides of the ring segment.

7. The tire building drum with a bead support assembly of claim 6 wherein the resiliently deformable body of material is defined by a nose-shaped projection that extends from near said selected one of the opposite sides of the ring segment in a direction generally away from the location of the concave groove, and portions of the cover that are located near said selected one of the opposite sides of the ring segment serve to envelope at least a portion of the nose-shaped projection.

8. The tire building drum with a bead support assembly of claim 7 wherein the nose-shaped projection is formed as an integral part of the elongate ring segment and projects transversely from said selected one of the opposite sides of the ring segment.

9. The tire building drum with a bead support assembly of claim 8 wherein the nose-shaped projection is a ring-shaped formation that projects axially to one side of the concave groove, and which is axially slit so as to define a plurality of independently movable nose-shaped members that, taken together, comprise the nose-shaped projection.

10. The tire building drum with a bead support assembly of claim 5 wherein the resiliently deformable body of material includes a resiliently compressible body formation, and the resilient deformation that takes place when the central portions of the cover move in opposition to the action of the biasing means includes resilient compression of at least a portion of the resiliently compressible body formation.

11. The tire building drum with a bead support assembly of claim 5 wherein the resiliently deformable body of material includes a resiliently bendable body formation, and the resilient deformation that takes place when the central portions of the cover move in opposition to the action of the biasing means includes resilient bending of at least a portion of the resiliently bendable body formation.

12. The tire building drum with a bead support assembly of claim 5 wherein the resiliently deformable body of material includes a nose-shaped projection that extends into engagement with portions of the cover.

13. The tire building drum with a bead support assembly of claim 3 wherein, the cover and the ring segment have overlying engaging surfaces that extend along at least one of said opposite sides of the ring segment, the overlying engaging surfaces are provided with interengaging connection means for establishing a substantially continuous interconnection between said overlying engaging surfaces, with said interconnection extending substantially the full length of the elongate ring segment.

14. The tire building drum with a bead support assembly of claim 13 wherein the interengaging connecting portions include an undercut groove that is formed in the ring segment, and a correspondingly configured projection that is an integral part of the cover and that extends into tight fitting relationship with the undercut groove.

15. The tire building drum with a bead support assembly of claim 3 wherein the ring segment is formed from a relatively hard material such as a polyurethane having a Shore A hardness within the range of about 60 to 70.

16. The tire building drum with a bead support assembly of claim 3 wherein the cover is formed from a relatively soft material such as a polyurethane having a Shore A hardness within the range of about 40 to 50.

17. The tire building drum with a bead support assembly of claim 3 additionally including a rigid, outwardly opening channel-shaped member having a bottom wall that extends transversely relative to the length of the concave groove, and having opposed, spaced, parallel-extending side walls that project outwardly from the bottom wall to define a channel into which inner portions of the ring segment extend for being supported at least in part by the channel-shaped member.

18. The tire building drum with a bead support assembly of claim 17 wherein the ring segment has opposite side portions that are sandwiched between spaced portions of the cover that extend parallel to and are snugly engaged by the side walls of the channel-shaped member.

19. The tire building drum with a bead support assembly of claim 3 wherein the elongate ring segment defines a complete ring, and the cover is an annular, band-shaped structures that encircles the circumference of the complete ring.

20. The tire building drum with a bead support assembly of claim 19 wherein the complete ring and the annular, band-shaped structure are formed separately as moldings of plastic material.

21. The tire building drum with a bead support assembly of claim 3 wherein central portions of the width of the generally concave groove are defined by a pair of oppositely inclined side wall portions that are smoothly connected by curved bottom wall portions that have a relatively small radius whereby the central portions of the width of the groove have a generally V-shaped appearance when viewed in cross-section.

22. The tire building drum with a bead support assembly of claim 21 wherein the pair of oppositely inclined side wall portions are substantially flat at least in the vicinities of their juncture with the curved bottom wall portions.

23. The tire building drum with a bead support assembly of claim 3 wherein the function of the biasing means in biasing central portions of the cover in a direction that extends generally away from the concave groove is assisted by forming the cover from molded material having a "memory" that causes cover material to tend to move in said direction that extends generally away from the concave groove toward said selected one of the opposite side of the ring segment.

24. The tire building drum with a bead support assembly of claim 3 wherein the cover is formed from resilient molded material that has a "memory," and the "memory" of the molded cover serves to bias central portions of the cover in a direction that extends generally away from the concave groove toward a selected one of the opposite sides of the ring segment so that, when the cover is not being engaged by bead portions of a tire, central portions of the cover tend to move generally away from the concave groove toward the selected side.

25. The tire building drum with a bead support assembly having parts which move relative to each other and that cooperate to define a generally concave, outwardly facing groove segment for receiving and retaining within the groove segment bead portions of a tire that is being built on a tire building drum, and for movably supporting such bead portions to enable such bead portions to be rotated through a limited range of movement while being retained by the groove and without causing bead portion malformation or distortion, comprising:
 a) support means including at least one substantially rigid, elongate ring segment having an outwardly facing support surface that has a support surface length that extends along the length of the ring segment, that has a support surface width that extends between opposite sides of the ring segment, and that defines an outwardly facing, generally concave groove having a groove length that extends along the ring segment length, and having a side-to-side groove width that extends transversely relative to the groove length;
 b) cover means including a substantially flexible sheath of material forming a cover that is connected to the support means at locations on opposite sides of groove, that has a cover length that extends along the support surface length, and that has central portions that extend transversely to define a cover width that is greater than the support surface width for permitting selected parts of the central portions to overlie the outwardly facing support surface, for extending into the groove to provide a cover-overlain groove of generally concave shape for receiving, supporting and retaining tire bead portions within the confines of the cover-overlain groove, and for being slidably movable within the concave groove in coordination with the rotation of groove-retained bead portions through a limited range of rotation movement so that a substantially non-slipping type of engagement is maintained between the selected parts of the cover and such bead portions as are engaged thereby, and with said coordination of the sliding movement of central portions of the cover with rotation movement of the bead portions serving to minimize the possibility that bead portion malformation or distortion may occur during rotation movement of the bead portions; and,
 c) interfitting formation means carried by the ring segment and by the cover for guiding the sliding movement of the central portions of the cover relative to the ring segment.

26. The tire building drum with a bead support assembly of claim 25 wherein the interfitting formation means includes an array of spaced, transversely extending slot formations that are formed in the ring segment and open into the concave groove, and a correspondingly spaced array of transversely extending spline projections that are formed as integral parts of the cover and are receivable within the slot formations for guiding transverse sliding movements of the cover relative to the ring segment, and that prevent movement of the cover relative to the ring segment in directions extending along the length of the concave groove.

27. The tire building drum with a bead support assembly of claim 25 wherein the interfitting formation means includes an array of spaced, transversely extending slot formations that are formed in the cover and open into the concave groove, and a correspondingly spaced array of transversely extending spline projections that are formed as integral parts of the ring segment and are receivable within the slot formations for guiding transverse sliding movements of the cover relative to the ring segment, and that prevent movement of the cover relative to the ring segment in directions extending along the length of the concave groove.

28. The tire building drum with a bead support assembly of claim 27 additionally including lubricant means interposed between such portions of the interfitting formation means as are carried by the ring segment and such portions of the interfitting formation means as are carried by the cover for facilitating relative sliding movement therebetween.

29. The tire building drum with a bead support assembly of claim 27 wherein the interfitting formation means includes elongate, interfitting spline-and-groove formations that are defined by the central portions of the cover and by the support surface of the ring segment, with the spline-and-groove formations extending substantially parallel to each other in a direction that is transverse to the length of the concave groove.

30. The tire building drum with a bead support assembly of claim 29 additionally including lubricant means interposed between such portions of the spline-and-groove formations as are defined by the ring segment and such portions of the spline-and-groove formations as are defined by the cover for facilitating relative sliding movement therebetween.

31. The tire building drum with a bead support assembly of claim 29 wherein the spline-and-groove formations are configured to closely interfit so as to also serve the function of preventing movement of the central portions of the cover relative to the support surface of the ring segment in directions that extend along the length of the groove.

32. The tire building drum with a bead support assembly of claim 29 additionally including lubricant means interposed between such portions of the spline-and-groove formations as are defined by the ring segment and such portions of the spline-and-groove formations as are defined in the cover for facilitating relative sliding movement therebetween in directions that extend along the interfitting spline-and-groove formations.

33. The tire building drum with a bead support assembly having parts which move relative to each other and that cooperate to define a generally concave, outwardly facing groove segment for receiving and retaining within the groove segment bead portions of a tire that is being built on a tire building drum, and for movably supporting such bead portions to enable such bead portions to be rotated through a limited range of movement while being retained and without causing bead malformation or distortion, comprising:
 a) support means including at least one substantially rigid, elongate ring segment having an outwardly facing support surface that has a support surface length that extends along the length of the ring segment, that has a support surface width that extends between opposite sides of the ring segment, and that defines an outwardly facing, generally concave groove that extends along the ring segment length at a location that is between the opposite sides of the ring segment;
 b) cover means including a substantially flexible sheath of material forming a cover that is connected to the support means along opposite sides of the groove, that has a cover length that extends along the support surface length, and that has central portions that extend for a cover width that is greater than the support surface width for permitting selected parts of the central portions to overlie the outwardly facing support surface, for extending into the groove to provide a cover-overlain groove that substantially conforms to the shape of the concave groove, and for receiving, supporting and retaining within the confines of the cover-overlain groove tire bead portions that extend into the cover-overlain groove; and, c) biasing means interposed between the support means and the cover means for biasing the central portions of the cover in a direction that extends generally away from the concave groove toward a selected one of the opposite sides of the ring segment, whereby, when bead portions that extend into the cover-overlain groove are caused to rotate through a limited range of movement while being retained within the cover-overlain groove, the selected parts of the cover that are in engagement with such bead portions slide within the concave groove in opposition to the action of the biasing means, with the sliding movement of the selected parts of the cover being coordinated with the rotation of the bead portions so that a substantially non-slipping type of engagement is maintained between the selected parts of the cover and such bead portions as are engaged thereby, and with such coordinated movement minimizing the possibility that bead portion malformation or distortion may occur during bead rotation.

34. The tire building drum with a bead support assembly of claim 33 wherein the biasing means includes a resiliently deformable body of material that is interposed between the ring segment and the central portions of the cover at a location near the selected one of the opposite sides of the ring segment, and the biasing means is configured to be resiliently deformed during said sliding movement of the selected parts of the cover.

35. The tire building drum with a bead support assembly of claim 33 additionally including interfitting formation means carried by the ring segment and be the cover for guiding the sliding movement of the central portions of the cover relative to the ring segment.

36. The tire building drum with a bead support assembly of claim 33 wherein the elongate ring segment defines a complete ring, and the cover is an annular, band-shaped structure that encircles the circumference of the complete ring.

37. The tire building drum with a bead support assembly having parts which move relative to each other that cooperate to define a generally concave, outwardly facing groove segment for receiving and retaining within the groove segment bead portions of a tire that is being built on a tire building drum, and for removably supporting such bead portions to enable such bead portions to be rotated through a limited range of movement while being retained and without causing bead portion malformation or distortion, comprising:

a) support means including at least one substantially rigid, elongate ring segment having an outwardly facing support surface that has a support surface length that extends along the length of the ring segment, that has a support surface width that extends between opposite sides of the ring segment, and that defines an outwardly facing, generally concave groove that extends along the ring segment length at a location that is between the opposite sides of the ring segment;

b) cover means including a substantially flexible sheath of material forming a cover that is connected to the support means at locations on opposite sides of groove, that has a cover length that extends along the support surface length, and that has central portions that extend for a cover width that is greater than the support surface width for permitting selected parts of the central portions to overlie the outwardly facing support surface, for extending into the groove to provide a cover-overlain groove that substantially conforms to the shape of the concave groove, and for receiving, supporting and retaining within the confines of the cover-overlain groove tire bead portions that extend into the cover-overlain groove; and, c) interfitting formation means carried by the ring segment and by the cover for guiding central portions of the cover during transverse sliding movements relative to the ring segment, whereby, when bead potions that extend into the cover-overlain groove are caused to rotate through a limited range of motion while being retained within the cover-overlain groove, the selected parts of the cover that are in engagement with such bead portions slide within the concave groove as guided by the interfitting formation means, with the sliding movement of the selected parts of the cover being coordinated with the rotation of the bead portions so that a substantially non-slipping type of engagement is maintained between the selected parts of the cover and such bead portions as are engaged thereby, and with such coordinated movement minimizing the possibility that bad portion malformation or distortion may occur during bead rotation.

38. The tire building drum with a bead support assembly of claim 37 wherein the interfitting formation means includes elongate, interfitting spline-and-groove formations that are defined by the central portions of the cover and by the support surface of the ring segment, with the spline-and-groove formations extending substantially parallel to each other in a direction that is transverse to the length of the concave groove.

39. The tire building drum with a bead support assembly of claim 37 additionally including biasing means interposed between the cover means and the support means for biasing the central portions of the cover in a direction that extends generally away from the concave groove toward a selected one of the opposite sides of the ring segment, whereby, when bead portions that extend into the cover-overlain groove are caused to rotate through a limited range of movement while being retained within the cover-overlain groove, the selected parts of the cover that are in engagement with such bead portions slide within the concave groove in opposition to the action of the biasing means.

40. The tire building drum with a bead support assembly of claim 39 wherein the biasing means includes a resiliently deformable body of material that is interposed between the ring segment and the central portions of the cover at a location near the selected one of the opposite sides of the ring segment, and the biasing means is configured to be resiliently deformed during said sliding movement of the selected parts of the cover.

41. The tire building drum with a bead support assembly of claim 37 wherein the elongate ring segment defines a complete ring, and the cover is an annular, band-shaped structure that encircles the circumference of the complete ring.

42. The tire building drum with a bead support assembly having parts which move relative to each other and that cooperate to define a generally concave, outwardly facing groove segment for receiving and retaining within the groove segment bead portions of a tire that is being built on a tire building drum, and for movably supporting such bead portions to enable such bead portions to be rotated through a limited range of movement while being retained by the groove and without causing bead portion malformation or distortion, comprising:

a) support means including at least one substantially rigid, elongate ring segment having an outwardly facing support surface that has a support surface length that extends along the length of the ring segment, that has a support surface width that extends between opposite sides of the ring segment, and that defines an outwardly facing, generally concave groove having a groove length that extends along the ring segment length, and having a side-to-side groove width that extends transversely relative to the groove length;

b) cover means including a substantially flexible sheath of material forming a cover that is connected to the support means at locations on opposite sides of groove, that has a cover length that extends along the support surface length, and that has central portions that extend transversely to define a cover width that is greater than the support surface width for permitting selected parts of the central portions to overlie the outwardly facing support surface, for extending into the groove to provide a cover-overlain groove of generally concave shape for receiving, supporting and retaining tire bead portions within the confines of the cover-overlain groove, and for being slidably movable within the concave groove in coordination with the rotation of groove-retained bead portions through a limited range of rotation movement so that a substantially non-slipping type of engagement is maintained between the selected parts of the cover and such bead portions as are engaged thereby, and with said coordination of the sliding movement of central portions of the cover with rotation movement of the bead portions serving to minimize the possibility that bead portion malformation or distortion may occur during rotation movement of the bead portions; and, c) biasing means connected to the cover means for biasing the central portions of the cover in a direction that extends generally away from the concave groove toward a selected one of the opposite sides of the ring segment, whereby, when bead portions that extend into the cover-overlain groove are caused to rotate through a limited range of movement while being retained within the cover-overlain groove, the selected parts of the cover that are in engagement with such bead portions slide within the concave groove in opposition to the action of the biasing means.

43. The tire building drum with a bead support assembly of claim 1 wherein the cover is formed from resilient molded material that has a "memory," and the "memory" of the molded cover serves to bias central portions of the cover in a direction that extends generally away from the concave groove toward a selected one of the opposite sides of the ring segment so that, when the cover is not being engaged by bead portions of a tire, central portions of the cover tend to move generally away from the concave groove toward the selected side.

44. The tire building drum with a bead support assembly of claim 1 wherein the function of the biasing means in biasing central portions of the cover in a direction that extends generally away from the concave groove is assisted by forming the cover from molded material having a "memory" that causes cover material to tend to move in said direction that extends generally away from the concave groove toward said selected one of the opposite side of the ring segment.

* * * * *